(12) United States Patent
Che et al.

(10) Patent No.: US 8,611,261 B2
(45) Date of Patent: Dec. 17, 2013

(54) CONTROL CHANNEL SIGNALING FOR MULTIPLE ACK/NACK ASSIGNMENTS

(75) Inventors: Xiang Guang Che, Beijing (CN); Kari Juhani Hooli, Oulu (FI); Kari Pekka Pajukoski, Oulu (FI); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 53 days.

(21) Appl. No.: 13/000,724

(22) PCT Filed: Jun. 24, 2009

(86) PCT No.: PCT/EP2009/057902
§ 371 (c)(1),
(2), (4) Date: Mar. 1, 2011

(87) PCT Pub. No.: WO2009/156441
PCT Pub. Date: Dec. 30, 2009

(65) Prior Publication Data
US 2011/0142075 A1    Jun. 16, 2011

Related U.S. Application Data

(60) Provisional application No. 61/132,914, filed on Jun. 24, 2008.

(51) Int. Cl.
*H04B 7/005* (2006.01)
*H04J 3/16* (2006.01)
(52) U.S. Cl.
USPC .......................................... 370/278; 370/468
(58) Field of Classification Search
None
See application file for complete search history.

(56) References Cited

U.S. PATENT DOCUMENTS

| | | | | |
|---|---|---|---|---|
| 7,636,328 B2* | 12/2009 | Teague et al. | ................. | 370/277 |
| 7,672,286 B2* | 3/2010 | Qian et al. | ..................... | 370/342 |
| 8,107,426 B2* | 1/2012 | Cho et al. | ..................... | 370/329 |
| 8,116,277 B2* | 2/2012 | Lee et al. | ...................... | 370/329 |
| 8,134,940 B2* | 3/2012 | Torsner et al. | ................ | 370/280 |
| 8,165,035 B2* | 4/2012 | Che et al. | ...................... | 370/252 |
| 8,204,010 B2* | 6/2012 | Suzuki et al. | ................. | 370/329 |
| 8,228,936 B2* | 7/2012 | Inoue et al. | ................... | 370/441 |
| 8,281,204 B2* | 10/2012 | Hu et al. | ....................... | 714/749 |
| 8,472,358 B2* | 6/2013 | Torsner et al. | ................ | 370/280 |
| 8,483,133 B2* | 7/2013 | Navratil et al. | ............... | 370/328 |
| 8,488,567 B2* | 7/2013 | Papasakellariou et al. | ... | 370/336 |

(Continued)

OTHER PUBLICATIONS

"Linkage Between PUSCH MCS and Amount of Resources for Control on PUSCH", Nokia Siemens Networks, Nokia, 3GPP TSG RAN WG1 Meeting #53, R1-081852, May 5-9, 2008, (3 pages).

(Continued)

*Primary Examiner* — Gregory Sefcheck
(74) *Attorney, Agent, or Firm* — Harrington & Smith

(57) ABSTRACT

A method to control channel signaling between elements in a wireless network (e.g., a UE and a network node) is described. The method includes making a first assignment by assigning a first resource to a UE for single AN signaling. Making a second assignment by assigning a second resource to the UE for multi-bit AN signaling in conjunction with the single AN signaling is also included in the method. A resource block reserved for sending dynamic AN feedback includes the first resource and the second resource. The method includes providing (e.g., via a transmitter) an indication of the first assignment and the second assignment Apparatus and computer readable media are also described.

19 Claims, 6 Drawing Sheets

(56) References Cited

U.S. PATENT DOCUMENTS

| | | | | |
|---|---|---|---|---|
| 2008/0310547 | A1 | 12/2008 | Tiirola et al. | 375/296 |
| 2012/0099546 | A1* | 4/2012 | Cho et al. | 370/329 |
| 2012/0224532 | A1* | 9/2012 | Suzuki et al. | 370/328 |
| 2012/0307787 | A1* | 12/2012 | Montojo et al. | 370/329 |
| 2012/0307809 | A1* | 12/2012 | Farley et al. | 370/336 |
| 2013/0010660 | A1* | 1/2013 | Tynderfeldt et al. | 370/280 |

OTHER PUBLICATIONS

"Avoiding PUSCH Error Situations Caused by DL Allocation Grant Signalling Failure", Nokia Siemens Networks, Nokia, 3GPP TSG RAN WG1, Meeting #53, R1-081855, May 5-9, 2008, (4 pages).

"Increasing the Size of CQI by means of Enhanced Sequence Modulation", Nokia Siemens Networks, Nokia, 3GPP TSG RAN WG1, Meeting #50, R1-073658, Aug. 20-24, 2007, (4 pages).

"Comparison of a Single-Sequence and Multi Sequence Modulation with Existing DM RS Sequence Set", Nokia Siemens Networks, Nokia, 3GPP TSG RAN WG1, Meeting #52, R1-080938, Feb. 2008, (6 pages).

3GPP TS 36.211 V8.2.0 (Mar. 2008), 3rd Generation Partnership Project; Technical Specification Group Radio Access Network; Evolved Universal Terrestrial Radio Access (E-UTRA); Physical Channels and Modulation (Release 8), (65 pages).

3GPP TS 36.300, V8.4.0 (Mar. 2008), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), (126 pages).

"Uplink ACK/NACK bundling configuration in TDD", Huawei, 3GPP TSG-RAN-WG1 Meeting #53, R1-081789, May 2008, 3 pgs.

"Consideration on ACK/NACK bundling and Multi-ACK/NACK multiplexing in TDD", Huawei, 3GPP TSG-RAN-WG1 Meeting #53, R1-081790, May 2008, 2 pgs.

"Implicit Resource Allocation of ACK/NACK Signal in E-UTRA Uplink", NTT DoCoMo, Fujitsu, Mitsubishi Electric, 3GPP TSG RAN WG1 Meeting #48bis, R1-071650, Mar. 2007, 3 pgs.

"Multi-bits ACK/NACK signalling for LTE TDD", Nokia, Nokia Siemens Networks, 3GPP TSG RAN WG1 Meeting #53bis, R1-082589, Jun.-Jul. 2008, 5 pgs.

"Details of ACK/NACK bundling for TDD", Ericsson, TSG-RAN WG1 #52bis, R1-081566, Mar.-Apr. 2008, 4 pgs.

"Multiplexing ACK/NACK with CQI", Alcatel-Lucent Technologies, 3GPP TSG-RAN WG1 #50bis, R1-074272, Oct. 2007, 3 pgs.

"Downlink scheduling for ACK/NACK bundling", Nokia, Nokia Siemens Networks, 3GPP TSG RAN WG1 Meeting #52bis, R1-081452, Mar.-Apr. 2008, 3 pgs.

"Frame structure for E-UTRA TDD mode", IPWireless, 3GPP TSG RAN WG1#46, R1-062378, Aug.-Sep. 2006, 8 pgs.

* cited by examiner

FIG 1

| Cyclic shift | Orthogonal cover code | | | Currently unused |
| --- | --- | --- | --- | --- |
| | 0 | 1 | 2 | 4 |
| 0 | 0 | | 0_multiAN | |
| 1 | | 6 | | 6_multiAN |
| 2 | 1 | | 1_multiAN | |
| 3 | | 7 | | 7_multiAN |
| 4 | 2 | | 2_multiAN | |
| 5 | | 8 | | 8_multiAN |
| 6 | 3 | | 3_multiAN | |
| 7 | | 9 | | 9_multiAN |
| 8 | 4 | | 4_multiAN | |
| 9 | | 10 | | 10_multiAN |
| 10 | 5 | | 5_multiAN | |
| 11 | | 11 | | 11_multiAN |

FIG 2

| Cyclic shift | Orthogonal cover code | | | Unused |
|---|---|---|---|---|
| | 0 | 1 | 2 | 4 |
| 0 | 0 | | 12 | |
| 1 | | 6 | | |
| 2 | 1 | | 13 | |
| 3 | | 7 | | |
| 4 | 2 | | 14 | |
| 5 | | 8 | | |
| 6 | 3 | | 15 | |
| 7 | | 9 | | |
| 8 | 4 | | 16 | |
| 9 | | 10 | | |
| 10 | 5 | | 17 | |
| 11 | | 11 | | |

FIG 3

| Cyclic shift | Orthogonal cover code | | |
|---|---|---|---|
| | 0 | 1 | 2 |
| 0 | 0 | | 11_multiAN |
| 1 | 0_multiAN | 4 | |
| 2 | | 4_multiAN | 8 |
| 3 | 1 | | 8_multiAN |
| 4 | 1_multiAN | 5 | |
| 5 | | 5_multiAN | 9 |
| 6 | 2 | | 9_multiAN |
| 7 | 2_multiAN | 6 | |
| 8 | | 6_multiAN | 10 |
| 9 | 3 | | 10_multiAN |
| 10 | 3_multiAN | 7 | |
| 11 | | 7_multiAN | 11 |

FIG 7

| Cyclic shift | Orthogonal cover code | | |
|---|---|---|---|
| | 0 | 1 | 2 |
| 0 | X | | |
| 1 | X | | |
| 2 | | | |
| 3 | Y | Y | |
| 4 | | | |
| 5 | Z | | |
| 6 | | Z | |
| 7 | | | |
| 8 | | | |
| 9 | | | |
| 10 | | | |
| 11 | | | |

FIG 8

Making a first assignment by assigning a first resource to a UE for single AN signaling — 810

Making a second assignment by assigning a second resource to the UE for multi-bit AN signaling in conjunction with the single AN signaling, where a resource block reserved for sending dynamic AN feedback comprises the first resource and the second resource — 820

Providing, via a transmitter, an indication of the first assignment and the second assignment — 830

CONTROL CHANNEL SIGNALING FOR MULTIPLE ACK/NACK ASSIGNMENTS

CROSS-REFERENCE TO RELATED APPLICATIONS

This patent application claims priority from PCT Application No. PCT/EP2009/057902 which claims priority from U.S. Provisional Patent Application No. 61/132,914 filed Jun. 24, 2008, the disclosures of which are incorporated by reference herein in their entirety.

TECHNICAL FIELD

The exemplary and non-limiting embodiments of this invention relate generally to wireless communication systems, methods, devices and computer programs and, more specifically, relate to control channel signaling between a mobile user device and a wireless network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:
3GPP third generation partnership project
ACK acknowledge
AN ACK/NACK
CM cubic metric
CP cyclic prefix
CQI channel quality indicator
DAI downlink activity indicator
DFT discrete Fourier transform
DL downlink (eNB towards UE)
DTX discontinuous transmission
eNB EUTRAN Node B (evolved Node B)
EPC evolved packet core
EUTRAN evolved UTRAN (LTE)
FDD frequency division duplex
FDMA frequency division multiple access
HARQ hybrid automatic repeat request
LTE long term evolution
MAC medium access control
MIMO multiple input multiple output
MM mobility management
MME mobility management entity
MSM multi-sequence modulation
NACK not (negative) acknowledge
Node B base station
O&M operations and maintenance
OC orthogonal cover
OCC orthogonal cover code
OFDMA orthogonal frequency division multiple access
PDCP packet data convergence protocol
PHY physical
PRB physical resource block (180 kHz)
PUCCH physical uplink control channel
PUSCH physical uplink shared channel
QPSK quadrature phase shift keying
RB resource block
RLC radio link control
RRC radio resource control
RRM radio resource management
RS reference signal
S synchronous
SC-FDMA single carrier, frequency division multiple access
SF spreading factor
S-GW serving gateway
SIMO single input multiple output
SR scheduling request
TDD time division duplex
TTI transmission time interval
UE user equipment
UL uplink (UE towards eNB)
UTRAN universal terrestrial radio access network
ZAC zero auto-correlation code The specification of a communication system known as evolved UTRAN (E-UTRAN, also referred to as UTRAN-LTE or as E-UTRA) is nearing completion within 3GPP. In this system the DL access technique will be OFDMA and the UL access technique will be SC-FDMA.

One specification of interest is 3GPP TS 36.300, V8.4.0 (2008-03), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8). One section of particular relevance to the ensuing discussion is Section 5.2, Uplink Transmission Scheme.

FIG. 5 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMES/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configuration for mobility and scheduling.

Of particular interest herein are the Layer 1 (PHY) specifications, such as those found in 3GPP TS 36.211 V8.2.0 (2008-03), 3rd Generation Partnership Project; Technical Specification Group Radio Access Network; Evolved Universal Terrestrial Radio Access (E-UTRA); Physical Channels and Modulation (Release 8). More specifically, of particular relevance herein is the resource allocation for dynamic ACK/NACK resources (PUCCH Format 1a/1b) in the TDD mode of the LTE system.

There are certain differences between the LTE TDD and FDD modes regarding control signaling. In the FDD mode each DL sub-frame has a dedicated UL sub-frame to be used to transmit DL related L1/L2 control signals, such as ACK/NACK. However, in the TDD mode a single UL sub-frame is required to support the signaling of L1/L2 control signals from multiple DL sub-frames. The number of DL sub-frames associated with a single UL sub-frame depends on the DL-UL ratio, which is configured by broadcast system information.

Two different approaches have been discussed in 3GPP regarding the ACK/NACK signaling in TDD mode. A first approach can be referred to as ACK/NACK bundling (bundled-AN), where ACK/NACK feedback related to multiple DL sub-frames is compressed into a single ACK/NACK feedback transmitted via a single ACK/NACK resource. A second approach can be referred to as multi-ACK/NACK (multi-AN), where each DL sub-frame is considered as a separate HARQ process, and where a separate ACK/NACK feedback is transmitted for each (granted) DL sub-frame.

The 3GPP specification effort related to the ACK/NACK bundling approach is almost complete, while the multi-ACK/NACK approach is currently an open item in the LTE Rel. 8 specifications.

Due to the implicit mapping, the ACK/NACK channel on the PUCCH is required to be pre-configured by broadcast higher layer signaling. This pre-configuration is referred to as ACK/NACK channelization. There is an existing channelization approach for the case where the given RB is used exclusively for a single ACK/NACK channel. Furthermore, there is a mechanism to support mixed allocation of ACK/NACKs (PUCCH Format 1/1a/1b) and periodic CQIs (PUCCH Format 2/2a/2b) in a single PUCCH PRB. All of these channelization arrangements are described in Section 5.4.1 of 3GPP TS 36.211. However, at present there is no agreed upon channelization solution for the multi-ACK/NACK approach.

Proposals that have been discussed in 3GPP to arrange the multi-ACK/NACK transmission in the PUCCH include the use of PUCCH Format 2 and block level spreading on top of the DFT-S-OFDMA transmission.

One problem inherent in these proposals is that the multiplexing capacity is basically only a maximum 6 UEs/RB. Another issue is that these proposals are not truly compatible with the existing PUCCH Format 1/1a/1b channelization. Note that PUCCH Format 1 channelization is used in the case of the bundled ACK/NACK approach.

It can be noted that multi-sequence modulation (MSM) has been previously proposed for LTE Rel. 8 FDD use. Reference in this regard can be made to R1-080938, 3GPP TSG RAN WG1 Meeting #52, Sorrento, Italy, Feb. 11-15, 2008, "Comparison of single-sequence and multi-sequence modulation with existing DM RS sequence set", Nokia Siemens Networks, Nokia. Reference can also be made to R1-073658, 3GPP TSG RAN WG1 Meeting #50, Athens, Greece, Aug. 20-24, 2007, "Increasing the size of the CQI by means of enhanced sequence modulation", Nokia Siemens Networks, Nokia. One goal of these proposals is to increase the control payload of the PUCCH Format 2

SUMMARY

The below summary section is intended to be merely exemplary and non-limiting.

The foregoing and other problems are overcome, and other advantages are realized, by the use of the exemplary embodiments of this invention.

In a first aspect thereof the exemplary embodiments of this invention provides a method to control channel signaling between elements in a wireless network (e.g., a UE and a network node). The method includes making a first assignment by assigning a first resource to a UE for single AN signaling. Making a second assignment by assigning a second resource to the UE for multi-bit AN signaling in conjunction with the single AN signaling is also included in the method. A resource block reserved for sending dynamic AN feedback includes the first resource and the second resource. The method includes providing (e.g., via a transmitter) an indication of the first assignment and the second assignment.

In a further aspect thereof the exemplary embodiments of this invention provides an apparatus to control channel signaling between elements in a wireless network. The apparatus includes at least one processor and at least one memory including computer program code. The at least one memory and the computer program code are configured to, with the at least one processor, cause the apparatus to perform at least the following operations: making a first assignment by assigning a first resource to a UE for single AN signaling; making a second assignment by assigning a second resource to the UE for multi-bit AN signaling in conjunction with the single AN signaling is also included in the apparatus (a resource block reserved for sending dynamic AN feedback includes the first resource and the second resource); and providing (e.g., via a transmitter) an indication of the first assignment and the second assignment.

In an additional aspect thereof the exemplary embodiments of this invention provides a computer readable medium to control channel signaling between elements in a wireless network. The computer readable medium is tangibly encoded with a computer program executable by a processor to perform actions: making a first assignment by assigning a first resource to a UE for single AN signaling; making a second assignment by assigning a second resource to the UE for multi-bit AN signaling in conjunction with the single AN signaling is also included in the computer readable medium (a resource block reserved for sending dynamic AN feedback includes the first resource and the second resource); and providing (e.g., via a transmitter) an indication of the first assignment and the second assignment.

In a further aspect thereof the exemplary embodiments of this invention provides a apparatus to control channel signaling between elements in a wireless network. The apparatus includes means for making a first assignment by assigning a first resource to a UE for single AN signaling. Means for making a second assignment by assigning a second resource to the UE for multi-bit AN signaling in conjunction with the single AN signaling is also included in the apparatus. A resource block reserved for sending dynamic AN feedback includes the first resource and the second resource. The apparatus includes means for providing (e.g., via a transmitter) an indication of the first assignment and the second assignment.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 shows a channelization arrangement for multi-AN in accordance with an exemplary embodiment of this invention.

FIG. 2 depicts a conventional channelization arrangement for a case where multi-AN is not used.

FIG. 3 depicts an example of a channelization arrangement for multi-AN case where only three OCC are available.

FIG. 7 is useful in describing different techniques to realize MSM on top of the existing PUCCH Format 1a/1b.

FIG. 8 is a logic flow diagram that illustrates the operation of an exemplary method, and a result of execution of computer program instructions embodied on a computer readable memory, in accordance with the exemplary embodiments of this invention.

DETAILED DESCRIPTION

As was noted previously, of particular relevance herein is the resource allocation for dynamic ACK/NACK resources (PUCCH Format 1a/1b) in the TDD mode of the LTE system. The exemplary embodiments of this invention provide an arrangement for multi-ACK/NACK signaling that is compatible with the existing PUCCH configuration.

Even though the non-limiting examples are given using LTE TDD, exemplary embodiments of this invention may be equally applicable in other situations having separate HARQ process, ACK/NACK feedback and resource allocation in other degree of freedom, e.g., in component carrier domain.

Figure 5:
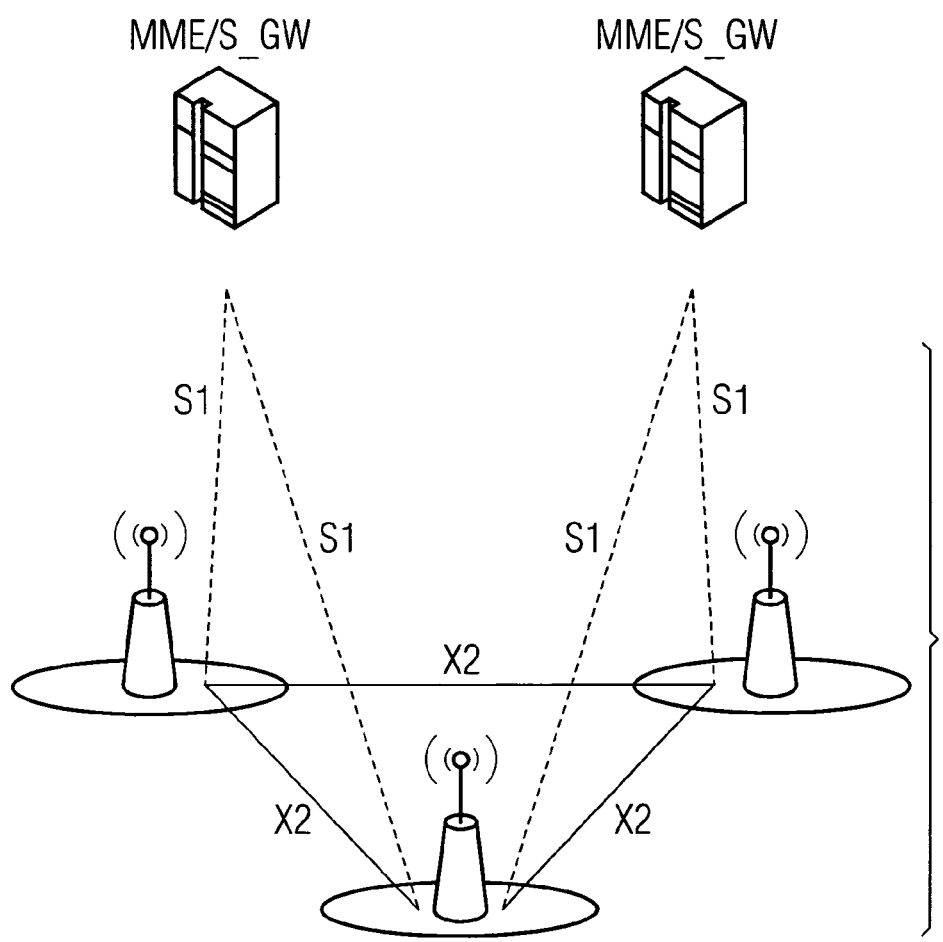
FIG. 5 reproduces FIG. 4 of 3GPP TS 36.300, and shows the overall architecture of the E-UTRAN system.
Figure 6:
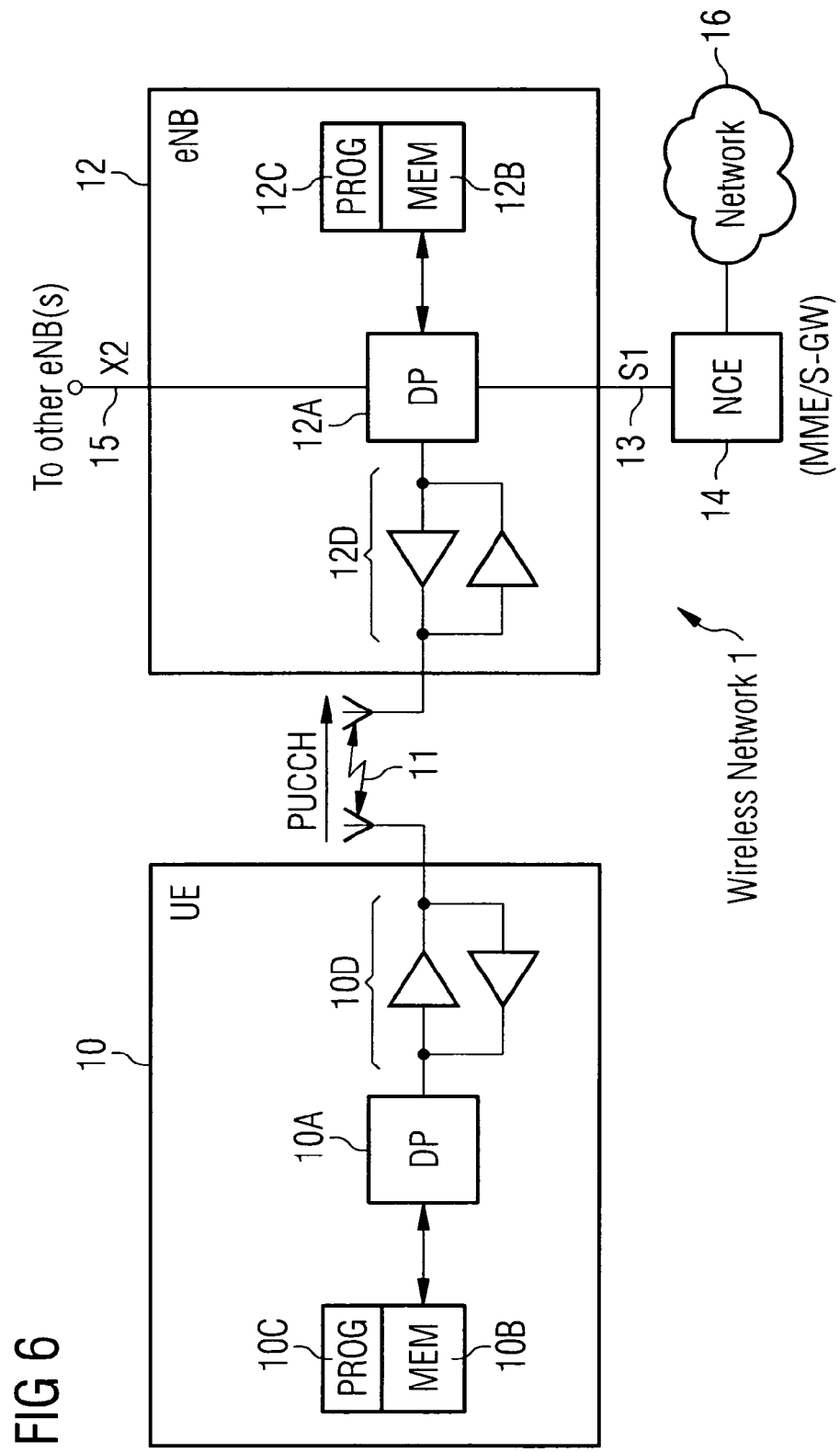
FIG. 6 shows a simplified block diagram of various electronic devices that are suitable for use in practicing the exemplary embodiments of this invention.

Reference is made to FIG. 6 for illustrating a simplified block diagram of various electronic devices that are suitable for use in practicing the exemplary embodiments of this invention. In FIG. 6 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 5, and which provides connectivity with a network 16, such as a telephone network and/or a data communications network (e.g., the internet).

The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas.

The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 5. The PROGs 10C and 12C may be assumed to include program instructions that, when executed by the associated DP, enable the electronic device to operate in accordance with the exemplary embodiments of this invention, as will be discussed below in greater detail.

The exemplary embodiments of this invention may be implemented at least in part by computer software executable by the DP 10A of the UE 10 and by the DP 12A of the eNB 12, or by hardware, or by a combination of software and hardware.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on multi-core processor architectures, as non-limiting examples.

The exemplary embodiments of this invention provide a channelization arrangement for a case where bundled ACK/NACK and multi-ACK/NACK can share the same PUCCH Format 1/1a/1b resource space.

In a first exemplary embodiment currently unused orthogonal cover code(s) (OCC) are used. Due to the fact that the multiplexing capacity of PUCCH Format 1/1a/1b is limited by the number of reference symbol channels, there are unused OCC resources related to the data part in PUCCH Format 1/1a/1b:

normal CP: 1 out of 4 OCC is unused;

extended CP: 2 out of four OCC are unused.

In this embodiment the unused OCC(s) are arranged to support multi-ACK/NACK signaling. Referring to FIG. 1, which shows an example of a channelization arrangement for multi-AN, the PUCCH resources under OCC 0 and OCC 1 are used as conventional implicit AN resources (Delta_shift=2, Delta_offset=0). However, the PUCCH resources under OCC 2 and OCC 3 are used as multi-AN resources. Note that each implicit resource has a dedicated resource for use in the case where multi-AN signaling is desired.

Support for multi-AN signaling can be provided by the use of existing Format 1 configuration options by higher layer signaling. In general, the multi-AN capability may be considered to be a cell-specific or UE-specific parameter that is configured by higher layers. When multi-AN signaling is not in use then the bundled-AN channelization can be performed in a conventional manner, as shown in FIG. 2 (Delta_shift=2, Delta_offset=0).

Note that the channelization related to the RS part may be unchanged in both the single AN and multi-AN cases (i.e., it may in all cases be as shown in FIG. 2), as MSM is used only for the data part. Alternatively, in the case where multi-AN is configured, it is possible to apply the same channelization for both the data and RS parts.

In certain special cases (e.g., shortened PUCCH format) there are only three OCCs available (i.e., there are no unused orthogonal cover codes). In accordance with a second exemplary embodiment in this case the multi-AN channelization may be arranged as shown in FIG. 3. In this case it can be seen that a UE 10 is assigned a particular cyclic shift of a particular orthogonal cover code for use in signaling first (bundled) ACK/NACK indications, and is then implicitly assigned an adjacent cyclic shift under the same orthogonal cover code for use in signaling second (multi-) ACK/NACK indications.

The multi-AN channelization as described herein may be used in conjunction with multi-sequence modulation, such as that described in U.S. patent application Ser. No. 12/157,113, filed Jun. 6, 2008, "Multi-Code Precoding for Sequence Modulation", Esa Tiirola, Kari Pajukoski and Kari Hooli.

Figure 4:
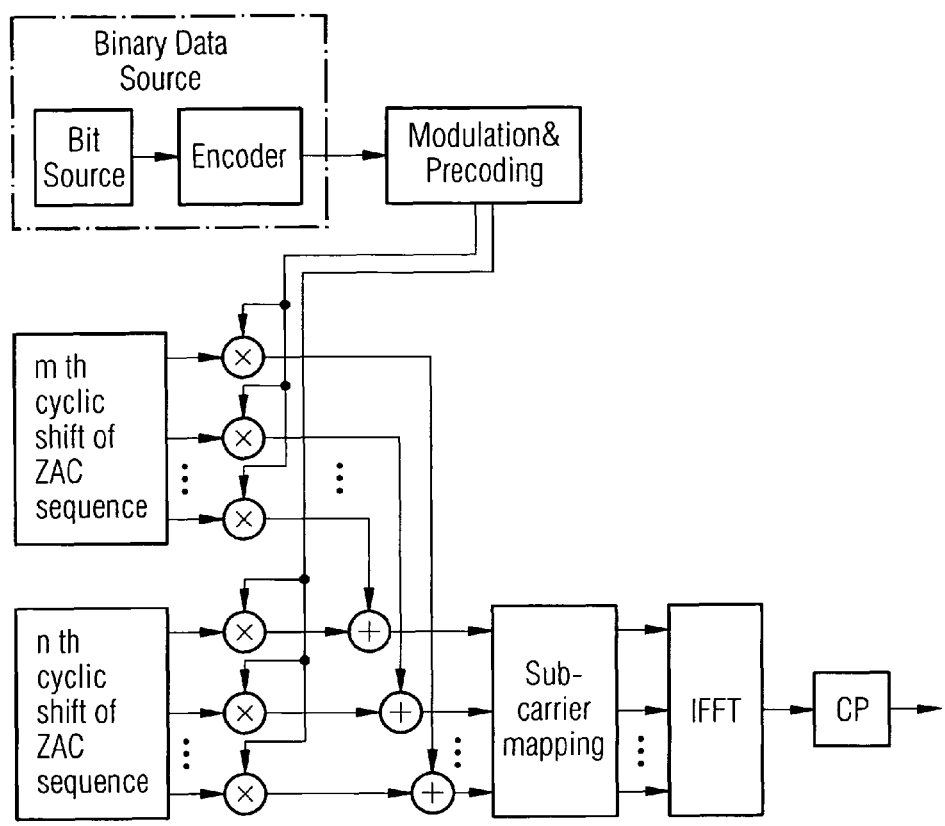
FIG. 4 is a simplified diagram of a multi-sequence modulator transmitter based on FIG. 1 of R1-080938.

FIG. 4 is a simplified diagram of a multi-sequence modulator transmitter structure based on FIG. 1 of R1-080938. Reference can also be made to, for example, FIGS. 4A-4C of U.S. patent application Ser. No. 12/157,113. Briefly, in MSM more than one cyclic shift of a root sequence can be allocated to one particular UE 10 in order to increase the symbol space. A precoding technique is used in order to decrease the peak-to-average (PAR). The output of the encoder is an input to a modulation and precoding block. After modulation and precoding the modulated and precoded bit stream is multiplied by $m^{th}$ and $n^{th}$ cyclic shifts of the same root sequence. The modulated sequences are combined and input to the inverse fast Fourier transform (IFFT) block, after which the CP is added. The precoding scheme can be implemented either as a discrete Fourier transform (DFT) spreader or as a specific constellation mapping table. An input of DFT is a block of symbols coming from the demodulator. The DFT operation generates a block of symbols for multi-sequence modulator. The size of the DFT input and output equals the number of cyclic shifts allocated to the particular UE 10.

In general, and referring to FIG. 7, there are basically different ways to realize MSM on top of the existing PUCCH Format 1a/1b. The first technique may be referred to as X-X, where MSM is used for two adjacent CS under the same OC (e.g., CSs 0 and 1 under OC 0). The CM properties for this approach are shown in FIG. 4 of R1-080938. The second technique may be referred to as Z-Z, where MSM is used for two adjacent CS under different OC (e.g., CS 5 under OC 0, and CS 6 under OC 1). In this approach the CM corresponds to that of the X-X technique. The third technique may be referred to as Y-Y, where MSM is used for two OCs under the same CS (e.g., CS 3 and OC 0 and OC 1). In this case the CM corresponds to that of a single code transmission with SF=4 and two code channels.

The multi-AN channelization as described herein may be used in conjunction with a conventional sequence selection method. For example, sequence selection can be made in such a way that some bits indicate the applied sequence whereas some other bits are modulated into the sequence used by indicated resource. Assume that two resources have been configured:
one bit is implicitly given by the sequence used (e.g., bit value corresponds to "0" if resource A is being used and "1" if resource B is being used); and
two bits are transmitted by means of the sequence modulation (QPSK) using the selected resource.

In the case where multi-sequence modulation is in use, then the following transport formats are available with multi-AN (8,N):
2DL-1UL B SIMO: QPSK, Joint coding, (8, 2)
2DL-1UL B MIMO: QPSK, Joint coding, (8, 4)
3DL-1UL B SIMO: QPSK, Joint coding, (8, 3)
3DL-1UL B MIMO: QPSK, Joint coding, (8, 3), bundling over spatial layer
4DL-1UL B SIMO: QPSK, Joint coding, (8, 4)
4DL-1UL B MIMO: QPSK, Joint coding, (8, 4), bundling over spatial layer It should be noted that the number of input bits, N, shown above represent the maximum number of input bits, in the case when all the scheduled grants have been successfully received by the UE 10. However, when using the 2-bit DAI as a pure counter, some of the last DL grants may have been failed. In this case the UE 10 does not have knowledge of the failed grants and, as a result, it will send the ACK/NACK/DTX based on the DAI, on the resource corresponding to the last correctly received DL grant.

It should also be noted that the number of parallel resources does not need to be limited to two. Also the modulation scheme can be different than QPSK. This implies that the number of output bits can be different than eight.

The above mentioned transmission formats (i.e., modulation & coding schemes for multi-bit ACK/NACK) can be used to signal the multi-bit ACK/NACK not only on the PUCCH but also on the PUSCH. Similarly as in the FDD mode, there are two parameters that scale the ACK/NACK resource size on the PUSCH (see R1-081852, "Linkage between PUSCH MCS and amount of control resources on PUSCH", 3GPP TSG RAN WG1 Meeting #53, Kansas City, Mo., USA, 5-9 May, 2008, Nokia Siemens Networks, Nokia):
N, which is the number of ACK/NACK bits during a single UL subframe (this is based on two-bit DAI included in the DL grant);
Offset_dB, which is a parameter to adjust the quality of multi-bits ACK/NACK signalling with respect to the PUSCH data part (configured by dedicated higher layer signaling).

Rate matching for the multi-bits ACK/NACK transmitted on PUSCH can be made in such a way that the number of symbols reserved for multi-bits ACK/NACK during a single UL subframe is set to be a multiple of four symbols ($M_{AN}$=k×4 symbols, $k^e${1, 2, 3, . . . }).

When signaling ACK/NACK on the PUSCH, one issue that is desirable to consider relates to the DTX-to-ACK problem. As discussed in R1-081855, "Avoiding PUSCH error situations caused by DL allocation grant signalling failure", 3GPP TSG RAN WG1 Meeting #53, Kansas City, Mo., USA, 5-9 May, 2008, Nokia Siemens Networks, Nokia, this problem can be solved by means of a single DTX indicator bit included in the UL grant. This will solve the DTX-to-ACK problem in both bundled ACK/NACK and multi-bits ACK/NACK cases. It is also noted that in the case of TDD mode, multiple signaling bits may be needed in UL grant to handle DL grant failure cases of multi-TTI allocation.

As a further consideration, it is noted that DTX relates to a case where one or more DL grants are not correctly received by the UE 10. In the case of the multi-AN embodiments of this invention the DTX issue can be addressed in a manner similar to the case of bundled ACK/NACK. That is, the UE 10 signals the grant-specific ACK/NACK in the case where all DL grants are correctly received. It can be assumed that the UE 10 has knowledge of the number of DL grants signaled (e.g., as two DAI bits included in the DL grant). In a case where all grants have failed, the UE 10 may simply send nothing (it has no reason to send ACK/NACK). The eNB 12 has the capability to identify this condition, as it includes a three stage receiver on the PUCCH: DTX/NACK/ACK. In a case where at least one DL grant has failed, then the DTX may be signaled in a manner similar to the case where all grants have failed. Alternatively, a two-bit DAI can be used as a pure counter. In this case ACK/NACK/DTX signaling can be made on the resource given by the predetermined DL grant.

It is instructive to make a comparison between the different PUCCH formats. For example:
PUCCH Format 1b: 18 UEs/RB, 2 bits/UE (QPSK: 4 uncoded bits per subframe); and
PUCCH Format 2: 6 UEs/RB, at maximum about 10 bits/UE (QPSK: 20 uncoded bits per subframe).

For the exemplary embodiments of this invention, based on Format 1b (multi-sequence modulation assumed): 12 UEs/RB, at maximum 4 bits/UE (QPSK: 8 uncoded bits per subframe).

Compared to the conventional Format 1b, the use of these exemplary embodiments doubles the control payload size, with a corresponding multiplexing capacity decrease of only one third (normal CP). Note that in the case of the extended CP the multiplexing capacity is not decreased at all.

The reduced multiplexing capacity is taken into account in PUCCH Format 1/1a/1b resource dimensioning. One option is to use the multi-AN channelization made possible by the use of these exemplary embodiments only for those PUCCH RBs reserved for dynamic AN. This approach limits the decreased multiplexing capacity only to dynamic ACK/NACK resources (the SR indicators and persistent ACK/NACK would not be affected by the decrease in multiplexing capacity).

These exemplary embodiments provide a channelization arrangement that supports multi-AN transmission in the LTE TDD mode. The channelization is compatible with the existing Format 1/1a/1b channelization. Furthermore, bundled AN and multi-AN UEs 10 can share the same UL resources. The multi-AN channelization in accordance with these exemplary embodiments may be viewed as an extension of the existing channelization used with bundled AN, and no additional dynamical signaling is needed. In addition, there is an implicit mapping of ACK/NACK resources that is similar for both bundled AN and multi-AN. Reference in this regard can be made to FIG. 1. Note, for example, that UE 0 is assigned CS 0 under OC 0 for bundled AN signaling, and is also assigned CS 0 under OC 2 for multi-AN signaling. Further, these exemplary embodiments can be realized with no CM increment (MSM for OCs under the same CS).

It is pointed out that while discussed thus far in the context of the TDD mode of operation, the same or similar embodiments may be used as well in the FDD half-duplex mode of operation.

FIG. 8 is a logic flow diagram that illustrates the operation of a method, and a result of execution of computer program instructions, in accordance with the exemplary embodiments of this invention. In accordance with these exemplary embodiments a method performs, at Block 810, a step of making a first assignment by assigning a first resource to a UE for single AN signaling. Making a second assignment by assigning a second resource to the UE for multi-bit AN signaling in conjunction with the single AN signaling, where a resource block reserved for sending dynamic AN feedback comprises the first resource and the second resource is performed at Block 820. At Block 830, a step of providing, via a transmitter, an indication of the first assignment and the second assignment is performed.

The various blocks shown in FIG. 8 may be viewed as method steps, and/or as operations that result from operation of computer program code, and/or as a plurality of coupled logic circuit elements constructed to carry out the associated function(s).

Based on the foregoing it should be apparent that the exemplary embodiments of this invention provide a method, apparatus and computer program(s) to provide an ACK/NACK signaling and channelization arrangement for a physical uplink control channel. The method includes, in one embodiment, assigning a UE a particular first resource (certain cyclic shift of a zero-autocorrelation sequence and a particular orthogonal cover code) for use in signaling ACK/NACK indications, and then in a pre-defined way assigning the UE a second resource (certain cyclic shift of the zero-autocorrelation sequence and a particular orthogonal cover code) for use in signaling multi-bits ACK/NACK indications together with the first resource (wherein each downlink sub-frame is considered as a separate hybrid automatic repeat process, and where a separate ACK/NACK feedback is transmitted for each granted downlink sub-frame).

In the method, apparatus and computer program(s) of the preceding paragraph, where there is at least one resource is not used for signaling the first (bundled) ACK/NACK indications, and where the at least one resource is used for signaling the multi-ACK/NACK indications.

In the method, apparatus and computer program(s) of the preceding paragraphs, where the multi-ACK/NACK indications are transmitted using multi-sequence modulation.

In the method, apparatus and computer program(s) of the preceding paragraphs, where a resource block is defined by 12 cyclic shifts and four orthogonal cover codes, and where a maximum of 12 UEs may be assigned to the resource block.

Exemplary embodiments in accordance with this invention may used in bandwidth extension (e.g., component carrier domain as used in LTE-Advanced). The principles described in reference to TDD sub-frame domains can also be applied to component carrier domains. For example, a TDD sub-frame may be considered analogous with component carrier. A single HARQ entity may exist per CC/TDD sub-frame and a single transport block may exist per CC/TDD sub-frame. Separately coded resource allocations may be allocated per a CC/TDD sub-frame. In other words, the problems in both cases are analogous. Therefore, embodiments in accordance with this invention may also be used in bandwidth extension situations.

Based on the foregoing it should be apparent that the exemplary embodiments of this invention also provide a method, apparatus and computer program(s) to provide an ACK/NACK signaling and channelization arrangement for a physical uplink control channel. The method includes, in one embodiment, assigning a UE a particular first resource (certain cyclic shift of a zero-autocorrelation sequence and a particular orthogonal cover code) for use in signaling ACK/NACK indications, and implicitly then assigning the UE a second resource (an adjacent cyclic shift of the zero-autocorrelation sequence under the same particular orthogonal cover code) for use in signaling multi-bits ACK/NACK indications together with the first resource (wherein each downlink sub-frame is considered as a separate hybrid automatic repeat process, and where a separate ACK/NACK feedback is transmitted for each granted downlink sub-frame).

In the method, apparatus and computer program(s) of the preceding paragraph, where all of the available orthogonal cover codes are used.

In the method, apparatus and computer program(s) of the preceding paragraphs, where the second multi-ACK/NACK indications are transmitted using multi-sequence modulation.

In the method, apparatus and computer program(s) of the preceding paragraphs, where a resource block is defined by 12 cyclic shifts and three orthogonal cover codes, and where a maximum of 12 UEs may be assigned to the resource block.

An exemplary embodiment in accordance with this invention is a method to control channel signaling between elements in a wireless network (e.g., between a UE and a network node). The method includes making a first assignment by assigning a first resource to a UE for single AN signaling. Making a second assignment by assigning a second resource to the UE for multi-bit AN signaling in conjunction with the single AN signaling is also included in the method. A resource block reserved for sending dynamic AN feedback includes the first resource and the second resource. The method includes providing (e.g., via a transmitter) an indication of the first assignment and the second assignment.

In a further embodiment of the method above, for single AN signaling, feedback related to a plurality of DL resources is compressed into a single AN feedback which is transmitted via a single AN resource.

In an additional embodiment of any one of the methods above, for multi-bit AN signaling each DL resource is considered as a separate HARQ process and a separate AN feedback is transmitted for each granted DL resource.

In a further embodiment of any one of the methods above, the first resource is a first cyclic shift of a ZAC sequence and an OCC and the second resource is one of: a second cyclic shift of the ZAC sequence and a second OCC, the first cyclic shift of the ZAC sequence and a second OCC and a second cyclic shift of the ZAC sequence and the first OCC.

In an additional embodiment of any one of the methods above, the resource block is a PUCCH PRB. The resource block may be configured in accordance with EUTRAN PUCCH Format 1/1a/1b.

In a further embodiment of any one of the methods above, the resource block is configured for use by twelve UE.

In an additional embodiment of any one of the methods above, the resource block is a TDD resource block.

In a further embodiment of any one of the methods above, assigning the second resource includes assigning the second resource is accordance with a pre-defined rule.

In an additional embodiment of any one of the methods above, assigning the second resource includes an implicit assignment based at least in part on the first resource.

A further exemplary embodiment in accordance with this invention is an apparatus to control channel signaling between elements in a wireless network. The apparatus includes at least one processor and at least one memory including computer program code. The at least one memory and the computer program code are configured to, with the at least one processor, cause the apparatus to perform at least the following operations: making a first assignment by assigning a first resource to a UE for single AN signaling; making a second assignment by assigning a second resource to the UE for multi-bit AN signaling in conjunction with the single AN signaling is also included in the apparatus (a resource block reserved for sending dynamic AN feedback includes the first resource and the second resource); and providing (e.g., via a transmitter) an indication of the first assignment and the second assignment.

In an additional embodiment of the apparatus above, for single AN signaling, feedback related to a plurality of DL resources is compressed into a single AN feedback which is transmitted via a single AN resource.

In a further embodiment of any one of the apparatus above, for multi-bit AN signaling each DL resource is considered as a separate HARQ process and a separate AN feedback is transmitted for each granted DL resource.

In an additional embodiment of any one of the apparatus above, the first resource is a first cyclic shift of a ZAC sequence and an OCC and the second resource is one of: a second cyclic shift of the ZAC sequence and a second OCC, the first cyclic shift of the ZAC sequence and a second OCC and a second cyclic shift of the ZAC sequence and the first OCC.

In a further embodiment of any one of the apparatus above, the resource block is a PUCCH PRB. The resource block may be configured in accordance with EUTRAN PUCCH Format 1/1a/1b.

In an additional embodiment of any one of the apparatus above, the resource block is configured for use by twelve UE.

In a further embodiment of any one of the apparatus above, the resource block is a TDD resource block.

In an additional embodiment of any one of the apparatus above, the apparatus also includes a transmitter.

In a further embodiment of any one of the apparatus above, assigning the second resource includes assigning the second resource is accordance with a pre-defined rule.

In an additional embodiment of any one of the apparatus above, assigning the second resource includes an implicit assignment based at least in part on the first resource.

A further exemplary embodiment in accordance with this invention is a computer readable medium to control channel signaling between elements in a wireless network. The computer readable medium is tangibly encoded with a computer program executable by a processor to perform actions: making a first assignment by assigning a first resource to a UE for single AN signaling; making a second assignment by assigning a second resource to the UE for multi-bit AN signaling in conjunction with the single AN signaling is also included in the computer readable medium (a resource block reserved for sending dynamic AN feedback includes the first resource and the second resource); and providing (e.g., via a transmitter) an indication of the first assignment and the second assignment.

In an additional embodiment of the computer readable medium above, for single AN signaling, feedback related to a plurality of DL resources is compressed into a single AN feedback which is transmitted via a single AN resource.

In a further embodiment of any one of the computer readable media above, for multi-bit AN signaling each DL resource is considered as a separate HARQ process and a separate AN feedback is transmitted for each granted DL resource.

In an additional embodiment of any one of the computer readable media above, the first resource is a first cyclic shift of a ZAC sequence and an OCC and the second resource is one of: a second cyclic shift of the ZAC sequence and a second OCC, the first cyclic shift of the ZAC sequence and a second OCC and a second cyclic shift of the ZAC sequence and the first OCC.

In a further embodiment of any one of the computer readable media above, the resource block is a PUCCH PRB. The resource block may be configured in accordance with EUTRAN PUCCH Format 1/1a/1b.

In an additional embodiment of any one of the computer readable media above, the resource block is configured for use by twelve UE.

In a further embodiment of any one of the computer readable media above, the resource block is a TDD resource block.

In an additional embodiment of any one of the computer readable media above, assigning the second resource includes assigning the second resource is accordance with a pre-defined rule.

In a further embodiment of any one of the computer readable media above, assigning the second resource includes an implicit assignment based at least in part on the first resource.

An additional exemplary embodiment in accordance with this invention is a apparatus to control channel signaling between elements in a wireless network. The apparatus includes means for making a first assignment by assigning a first resource to a UE for single AN signaling. Means for making a second assignment by assigning a second resource to the UE for multi-bit AN signaling in conjunction with the single AN signaling is also included in the apparatus. A resource block reserved for sending dynamic AN feedback includes the first resource and the second resource. The apparatus includes means for providing (e.g., via a transmitter) an indication of the first assignment and the second assignment.

In a further embodiment of the apparatus above, for single AN signaling, feedback related to a plurality of DL resources is compressed into a single AN feedback which is transmitted via a single AN resource.

In an additional embodiment of any one of the apparatus above, for multi-bit AN signaling each DL resource is considered as a separate HARQ process and a separate AN feedback is transmitted for each granted DL resource.

In a further embodiment of any one of the apparatus above, the first resource is a first cyclic shift of a ZAC sequence and an OCC and the second resource is one of: a second cyclic shift of the ZAC sequence and a second OCC, the first cyclic shift of the ZAC sequence and a second OCC and a second cyclic shift of the ZAC sequence and the first OCC.

In an additional embodiment of any one of the apparatus above, the resource block is a PUCCH PRB. The resource block may be configured in accordance with EUTRAN PUCCH Format 1/1a/1b.

In a further embodiment of any one of the apparatus above, the resource block is configured for use by twelve UE.

In an additional embodiment of any one of the apparatus above, the resource block is a TDD resource block.

In a further embodiment of any one of the apparatus above, the apparatus also includes means for transmitting.

In an additional embodiment of any one of the apparatus above, assigning the second resource includes assigning the second resource is accordance with a pre-defined rule.

In a further embodiment of any one of the apparatus above, assigning the second resource includes an implicit assignment based at least in part on the first resource.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules. It should thus be appreciated that the exemplary embodiments of this invention may be realized in an apparatus that is embodied in whole or in part as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system TDD mode, it should be appreciated that the exemplary embodiments of this invention are not limited for use with only this one particular type of wireless communication system, and that they may be used to advantage in other wireless communication systems, as well as in the FDD half-duplex mode as was noted above.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, channels and the like (e.g., PUCCH, etc.) are not intended to be limiting in any respect, as these parameters and channels may be identified by any suitable names. Further, the exemplary embodiments of this invention are not limited for use with only RBs structured such as those shown in FIGS. 1, 2 and 3 (e.g., more or less than 12 CSs could be used with more or less than three or four OCCs). Furthermore, the examples shown consider a format where Delta_shift is equal to two. This provides 18 resources per RB with normal CP and 12 resources per RB with extended CP. However, Delta_shift may also have values of, for example, one or three (or some other value), which means that the number of PUCCH Format resources per RB scales accordingly. The same applies when considering a mixed RB.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    making a first assignment by assigning a first resource to a user equipment for single acknowledge/negative-acknowledge signaling;
    making a second assignment by assigning a second resource to the user equipment for multi-bit acknowledge/negative-acknowledge signaling in conjunction with the single acknowledge/negative-acknowledge signaling, wherein assigning the second resource comprises an implicit assignment including an offset based at least in part on the first resource,
    where a resource block reserved for sending dynamic acknowledge/negative-acknowledge feedback comprises the first resource and the second resource; and
    providing, via a transmitter, an indication of the first assignment and the second assignment.

2. The method of claim 1, where, for single acknowledge/negative-acknowledge signaling, feedback related to a plurality of downlink resources is compressed into a single acknowledge/negative-acknowledge feedback which is transmitted via a single acknowledge/negative-acknowledge resource.

3. The method of claim 1, where for multi-bit acknowledge/negative-acknowledge signaling each downlink resource is considered as a separate hybrid automatic repeat process and a separate acknowledge/negative-acknowledge feedback is transmitted for each granted downlink resource.

4. The method of claim 1, where the first resource is a first cyclic shift of a zero-autocorrelation sequence and an orthogonal cover code and the second resource is one of:
    a second cyclic shift of the zero-autocorrelation sequence and a second orthogonal cover code, the first cyclic shift of the zero-autocorrelation sequence and a second orthogonal cover code and a second cyclic shift of the zero-autocorrelation sequence and the first orthogonal cover code.

5. The method of claim 1, where the resource block is a physical uplink control channel physical resource block.

6. The method of claim 5, where the resource block is configured in accordance with EUTRAN physical uplink control channel format 1/1a/1b.

7. The method of claim 1, where the resource block is configured for use by twelve user equipment.

8. The method of claim 1, where the resource block is a time division duplex resource block.

9. The method of claim 1, where assigning the second resource comprises assigning the second resource in accordance with a pre-defined rule.

10. An apparatus, comprising: at least one processor; and at least one memory including computer program code, the at least one memory and the computer program code configured to, with the at least one processor, cause the apparatus to perform at least the following:

to make a first assignment by assigning a first resource to a user equipment for single acknowledge/negative-acknowledge signaling;

to make a second assignment by assigning a second resource to the user equipment for multi-bit acknowledge/negative-acknowledge signaling in conjunction with the single acknowledge/negative-acknowledge signaling, wherein assigning the second resource comprises an implicit assignment including an offset based at least in part on the first resource, where a resource block reserved for sending dynamic acknowledge/negative-acknowledge feedback comprises the first resource and the second resource; and to provide, via a transmitter, an indication of the first assignment and the second assignment.

11. The apparatus of claim 10, where, for single acknowledge/negative-acknowledge signaling, feedback related to a plurality of downlink resources is compressed into a single acknowledge/negative-acknowledge feedback which is transmitted via a single acknowledge/negative-acknowledge resource.

12. The apparatus of claim 10, where for multi-bit acknowledge/negative-acknowledge signaling each downlink resource is considered as a separate hybrid automatic repeat process and a separate acknowledge/negative-acknowledge feedback is transmitted for each granted downlink resource.

13. The apparatus of claim 10, where the first resource is a first cyclic shift of a zero-autocorrelation sequence and an orthogonal cover code and the second resource is one of:

a second cyclic shift of the zero-autocorrelation sequence and a second orthogonal cover code, the first cyclic shift of the zero-auto correlation sequence and a second orthogonal cover code and a second cyclic shift of the zero-autocorrelation sequence and the first orthogonal cover code.

14. The apparatus of claim 10, where assigning the second resource comprises one of: assigning the second resource in accordance with a pre-defined rule and an implicit assignment based at least in part on the first resource.

15. A non-transitory computer readable medium tangibly encoded with a computer program executable by a processor to perform actions comprising:

making a first assignment by assigning a first resource to a user equipment for single acknowledge/negative-acknowledge signaling;

making a second assignment by assigning a second resource to the user equipment for multi-bit acknowledge/negative-acknowledge signaling in conjunction with the single acknowledge/negative-acknowledge signaling, wherein assigning the second resource comprises an implicit assignment including an offset based at least in part on the first resource, where a resource block reserved for sending dynamic acknowledge/negative-acknowledge feedback comprises the first resource and the second resource; and providing, via a transmitter, an indication of the first assignment and the second assignment.

16. The computer readable medium of claim 15, where the first resource is a first cyclic shift of a zero-autocorrelation sequence and an orthogonal cover code and the second resource is one of:

a second cyclic shift of the zero-autocorrelation sequence and a second orthogonal cover code, the first cyclic shift of the zero-autocorrelation sequence and a second orthogonal cover code and a second cyclic shift of the zero-autocorrelation sequence and the first orthogonal cover code.

17. The computer readable medium of claim 15, where assigning the second resource comprises one of: assigning the second resource in accordance with a pre-defined rule and an implicit assignment based at least in part on the first resource.

18. An apparatus comprising:

means for making a first assignment by assigning a first resource to a user equipment for single acknowledge/negative-acknowledge signaling;

means for making a second assignment by assigning a second resource to the user equipment for multi-bit acknowledge/negative-acknowledge signaling in conjunction with the single acknowledge/negative-acknowledge signaling, wherein assigning the second resource comprises an implicit assignment including an offset based at least in part on the first resource, where a resource block reserved for sending dynamic acknowledge/negative-acknowledge feedback comprises the first resource and the second resource; and means for transmitting an indication of the first assignment and the second assignment.

19. The apparatus of claim 18, where the first resource is a first cyclic shift of a zero-autocorrelation sequence and an orthogonal cover code and the second resource is one of:

a second cyclic shift of the zero-auto correlation sequence and a second orthogonal cover code, the first cyclic shift of the zero-autocorrelation sequence and a second orthogonal cover code and a second cyclic shift of the zero-autocorrelation sequence and the first orthogonal cover code.

\* \* \* \* \*